United States Patent
Romanenko et al.

(10) Patent No.: US 10,062,013 B2
(45) Date of Patent: Aug. 28, 2018

(54) METHOD OF IMAGE PROCESSING

(71) Applicant: Apical Ltd, Cambridge (GB)

(72) Inventors: Ilya Romanenko, Loughborough (GB); Ivan Tyukin, Leicester (GB); Alexander Gorban, Leicester (GB); Konstantin Sofeikov, Loughborough (GB)

(73) Assignee: Apical Ltd., Cambridge (GB)

( * ) Notice: Subject to any disclaimer, the term of this patent is extended or adjusted under 35 U.S.C. 154(b) by 68 days.

(21) Appl. No.: 15/389,858

(22) Filed: Dec. 23, 2016

(65) Prior Publication Data

US 2017/0185870 A1 Jun. 29, 2017

(30) Foreign Application Priority Data

Dec. 23, 2015 (GB) .................................. 1522819.0

(51) Int. Cl.
*G06K 9/00* (2006.01)
*G06K 9/62* (2006.01)
*G06K 9/46* (2006.01)
*G06T 7/70* (2017.01)

(52) U.S. Cl.
CPC ............. *G06K 9/6267* (2013.01); *G06K 9/46* (2013.01); *G06K 9/4604* (2013.01); *G06K 9/628* (2013.01); *G06T 7/70* (2017.01)

(58) Field of Classification Search
CPC ...... G06K 9/6247; G06K 9/6267; G06K 9/46; G06K 9/628; G06K 9/629; G06K 9/6269
See application file for complete search history.

(56) References Cited

U.S. PATENT DOCUMENTS

| | | | | |
|---|---|---|---|---|
| 2012/0243789 | A1* | 9/2012 | Yang | .................... G06K 9/4676 382/195 |
| 2014/0126817 | A1* | 5/2014 | Vitaladevuni | ........ G06K 9/6267 382/170 |
| 2014/0126824 | A1* | 5/2014 | Vitaladevuni | ........... G06F 17/16 382/190 |

(Continued)

FOREIGN PATENT DOCUMENTS

| | | |
|---|---|---|
| CN | 104881651 A | 9/2015 |
| CN | 105335758 A | 2/2016 |
| WO | 2004010329 A1 | 1/2004 |

OTHER PUBLICATIONS

Camastra, Francesco, and Antonino Staiano. "Intrinsic dimension estimation: Advances and open problems." Information Sciences 328 (2016): 26-41.

(Continued)

*Primary Examiner* — Utpal Shah
(74) *Attorney, Agent, or Firm* — EIP US LLP (57) ABSTRACT

According to an aspect of the present disclosure, there is provided a method of image processing. The method comprises receiving image data comprising a set of feature vectors of a first dimensionality, the feature vectors corresponding to a class of objects. A variable projection is applied to each feature vector in the set of feature vectors to generate a set of projected vectors of a second dimensionality. The method then comprises processing the set of projected vectors to generate a model for the class of objects. A projection is applied to the model to generate an object classification model, of the first dimensionality, for the class of objects.

19 Claims, 6 Drawing Sheets

(56) References Cited

U.S. PATENT DOCUMENTS

2015/0039260 A1* 2/2015 Niskanen ............ G06K 9/6244
702/141
2017/0039737 A1* 2/2017 Madabhushi ........ A61B 5/7267

OTHER PUBLICATIONS

Vinyals, Oriol, et al. "Learning with recursive perceptual representations." Advances in Neural Information Processing Systems. 2012.
Johnson, William B., and Assaf Naor. "The Johnson-Lindenstrauss lemma almost characterizes Hilbert space, but not quite." Proceedings of the twentieth Annual ACM-SIAM Symposium on Discrete Algorithms. Society for Industrial and Applied Mathematics, 2009.
Johnson, W., and J. Lindenstrauss. "Extensions of Lipschhitz maps into a Hilbert space." Contemporary Math 26 (1984).
Le, Quoc, Tamás Sarlós, and Alex Smola. "Fastfood-approximating kernel expansions in loglinear time." Proceedings of the international conference on machine learning 2013.
Durrant, Robert J., and Ata Kabán. "Random Projections as Regularizers: Learning a Linear Discriminant Ensemble from Fewer Observations than Dimensions." ACML. 2013.
Bingham, Ella, and Heikki Mannila. "Random projection in dimensionality reduction: applications to image and text data." Proceedings of the seventh ACM SIGKDD international conference on Knowledge discovery and data mining. ACM, 2001.
Lee, Soomin, and Angelia Nedić. "DrSVM: Distributed random projection algorithms for SVMs." 2012 IEEE 51st IEEE Conference on Decision and Control (CDC). IEEE, 2012.
Paul, Saurabh, et al. "Random Projections for Support Vector Machines." AISTATS. vol. 3. 2013.
Paul, Saurabh, et al. "Random projections for linear support vector machines." ACM Transactions on Knowledge Discovery from Data (TKDD) 8.4 (2014): 22.
Maudes, Jesús, et al. "Random projections for linear SVM ensembles." Applied Intelligence 34.3 (2011): 347-359.
Berger, Adam. "Error-correcting output coding for text classification." IJCAI-99: Workshop on machine learning for information filtering. 1999.
Shi, Qinfeng, et al. "Is margin preserved after random projection?" arXiv preprint arXiv:1206.4651 (2012).
Duarte, Marco F., et al. "Multiscale random projections for compressive classification." 2007 IEEE International conference on Image Processing. vol. 6. IEEE, 2007.
Blum, Avrim. "Random projection, margins, kernels, and feature-selection." Subspace, Latent Structure and Feature Selection. Springer Berlin Heidelberg, 2006. 52-68.
Gunduz, Hakan et al. "Glasses detection in face images using histogram of Oriented Gradients." 2014 22nd Signal Processing and Communications Applications Conference (SIU) (2014): 1889-1892.
GB Search Report dated Jun. 21, 2017 for GB Application No. GB1622153.3.

* cited by examiner

METHOD OF IMAGE PROCESSING

CROSS REFERENCE TO RELATED APPLICATIONS

This application claims priority to Great Britain patent application no. GB 1522819.0, filed on Dec. 23, 2015, which is incorporated by reference in its entirety herein.

TECHNICAL FIELD

The present disclosure relates to methods, apparatus and computer programs for producing and processing data associated with image processing.

BACKGROUND

It is known to use a classifier to identify an object of interest in an image. Classifiers attempting to identify an object in images where the object varies in appearance, for example due to distortion, may suffer reduced performance or failure where the variation is too high.

Examples of publications in relevant technical fields include:

Vinyals, Oriol, et al. "Learning with recursive perceptual representations." *Advances in Neural Information Processing Systems*. 2012;

Bingham, Ella, and Heikki Mannila. "Random projection in dimensionality reduction: applications to image and text data." *Proceedings of the seventh ACM SIGKDD international conference on Knowledge discovery and data mining*. ACM, 2001; and Paul, Saurabh, et al. "Random Projections for Support Vector Machines." *AISTATS*. Vol. 3. 2013.

It is desirable to provide a method of processing an image for generating an object classification model that is less susceptible to variation in an objects appearance when classifying the object.

SUMMARY

According to a first aspect of the disclosure, there is provided a method of image processing. The method comprises: receiving image data comprising a set of feature vectors of a first dimensionality, the feature vectors corresponding to a class of objects; generating a set of projected vectors of a second dimensionality, lower than the first dimensionality, by applying a variable projection to each feature vector in the set of feature vectors; processing the set of projected vectors to generate a model for the class of objects; and applying a projection to the model to generate an object classification model, of the first dimensionality, for the class of objects.

The variable projection may comprise a random, or pseudorandom, projection. Generating the set of projected vectors may comprise generating a plurality of sets of projected vectors of the second dimensionality by applying each of a plurality of variable projections to each feature vector in the set of feature vectors. Processing the set of projected vectors may comprise processing each of the plurality of sets of projected vectors to generate a plurality of models for the class of objects. Applying the projection to the model may comprise applying a projection to each of the plurality of models to generate a plurality of object classification models, of the first dimensionality, for the class of objects. In some examples, the method comprises testing each model of the plurality of models and indicating an accuracy value for each model based on the testing. The method may comprise selecting a subset of the plurality of models based on the accuracy values of the models. The method may additionally comprise applying a projection to each model in the subset of the plurality of models to generate a plurality of object classification models, of the first dimensionality, for the class of objects. Processing the set of projected vectors to generate a model for the class of objects may use a linear classification model, which may comprise at least one of: a support vector machine; a two neuron classifier; or a Fisher discriminant in some examples. The image data may be captured by an image sensor in some examples. Additionally or alternatively, the image data may represent at least part of one or more images, wherein each of the one or more images comprises an object of the class of objects, wherein the image data is processed by a feature extractor to produce the image data comprising the set of feature vectors corresponding to the class of objects. In some examples, receiving the image data comprises: capturing image data representing at least part of an image using an image sensor; on receiving an indication from an object detector that the image comprises an object of the class of objects, tracking the object and capturing, using the image sensor, image data corresponding to video frames comprising the object; and processing the image data using a feature extractor to produce the image data comprising the set of feature vectors corresponding to the class of objects.

According to a further aspect of the present disclosure, there is provided a non-transitory, computer-readable storage medium comprising a set of computer-readable instructions stored thereon which, when executed by at least one processor, cause the at least one processor to perform a method as described above.

According to a further aspect, there is provided a computer vision apparatus comprising a classifier, the classifier comprising at least one of a plurality of object classification models generated according to a method described in the first aspect of the disclosure. In some examples, the computer vision apparatus may comprise a feature extractor configured to receive image data representing at least part of an image, and produce image data comprising a plurality of feature vectors. The computer vision apparatus may comprise an image sensor, wherein the image data representing at least part of an image is captured by the image sensor. The classifier may be configured to: process the image data comprising the plurality of feature vectors; and determine, using the at least one of the plurality of object classification models, whether the image data comprises an object in the class of objects corresponding to the object classification models. The classifier may additionally be configured to indicate whether the image data comprises an object in the class of objects corresponding to the object classification models.

Further features and advantages of the methods and apparatuses will become apparent from the following description of preferred embodiments, given by way of example only, which is made with reference to the accompanying drawings.

DETAILED DESCRIPTION

In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Examples described herein provide a method of processing image data. The image data may be captured by an image sensor or image capture device, such as a camera or a video camera. The image data may correspond with a static image or a frame of a video and may be in any suitable image or video data format. Common formats of static images include the JPEG (Joint Photographic Experts Group) format, the GIF (Graphics Interchange Format), the BMP (Windows bitmap) format and the PNG (Portable Network Graphics) format. Typical formats for video data include the Audio Video Interleave (AVI) format, any of the MPEG (Motion Pictures Expert Group) formats such as MP4, MPEG-1 or MPEG-2, the AVCHD (Advanced Video Coding High Definition) format, or the DV or HDV formats (Digital Video or High-definition Digital Video). The image data may represent at least part of an image captured by an image sensor: the image may include any graphical or visual content, for example text, graphics, pictures, and/or photographs.

Object classification may be difficult in cases where an object, of a predetermined class of objects for classifying, varies in shape or is distorted when captured in an image. For example, in any system comprising an image sensor with an off-axis field-of-view, object classifiers may have much reduced accuracy for identifying and classifying objects and may indicate more false negatives. An example of such a case is a system wherein images are captured via a wide-angle lens and/or an elevated image sensor.

Wide-angle, or fisheye, lenses and cameras may be used in smart home or smart office systems, which may include multiple computer vision systems performing various functions such as object detection, object tracking, and scene interpretation. For example, a camera with a wide-angle lens that is placed on a ceiling of a room may cover the whole room in one shot, and communicate its captured image and/or video data feed. The wide-angle lens may, however, exhibit viewing-angle distortion of an object, whereby the object varies in shape in the image depending on where the object is positioned relative to the lens and the image sensor. For example, a person in the centre of the image may be enlarged when viewed at a short distance by the image sensor, and so the appearance of a person standing at the centre of the lens may be dramatically different from a person stood at the edge of the lens. Hence, as a person walks around the field of view of the image sensor in this example, their shape through the wide-angle, or fisheye, lens may be highly distorted.

Difficulties may also arise in systems where a camera is elevated with respect to a scene which it may be capturing, such as placement of a camera on or near a ceiling of a room. A camera placed at an elevation may not capture some part of the object, whether or not the camera employs a wide-angle lens, which may make the task of object detection and classification even more complex. As an example, most of a person's body may be hidden from a view of a camera when the person is standing directly underneath the camera, and so dimensions and/or proportions of their shape in the captured image(s) may be significantly distorted.

There is therefore a need for a system performing object detection that would be able to detect objects that may be distorted and that may vary in shape due to the optics of the image sensor, the placement of the image sensor and/or the positioning of the object relative to the image sensor.

There is also a need for creating a set of training images, covering many possible object-view variations, that may be used in such an object detection system in which objects vary, for example in shape or by distortion.

Figure 1:
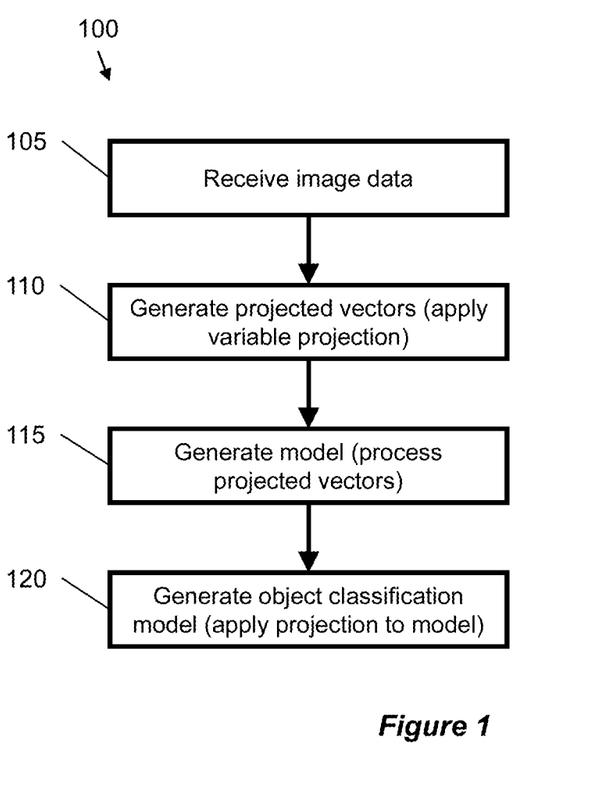
FIG. 1 shows a flow diagram of a method according to some embodiments.

FIG. 1 shows a flow diagram of a method 100 of image processing. The method comprises a receiving step 105 in which image data is received. The image data may be of any suitable format for processing. The image data includes a set of feature vectors of a first dimensionality, which may be derived from an image or raw image data captured by an image sensor, corresponding with a particular class of objects, for example human faces.

The image sensor may comprise a charge-coupled device or complementary metal-oxide-semiconductor image sensor. In other examples, the image sensor may comprise a motion detector, an ultrasonic sensor, an infra-red sensor, or a radar receiver such as a phased array radar receiver. The sensor itself may perform image processing steps in relation to the raw image data and/or image processing may be performed by a separate image processor or processors.

Feature vectors may correspond with descriptors that represent or characterize features of an image that the image data represents, for example features of particular key-points or distinctive regions of the image, such as a human face, or a feature indicating a human face, in the given example. Various different methods may be used to obtain suitable feature vectors. For example, the feature vectors may be based on, or include, one or more of: a Histogram of Oriented Gradients (HoG); Haar-like features that are, for example, intuitively similar to Haar wavelets; Local Binary Patterns (LBP); a bag of words (which typically involves a histogram representation of an image based on image features); or vectors obtained from a neural network such as a convolutional neural network. The feature vectors may be normalized appropriately, for example using the L-2 norm (sometimes referred to as the Euclidean norm). The feature vectors may therefore be considered to correspond to points on a sphere in a multidimensional space.

The image data received during the receiving step 105 may correspond to multiple images that each comprise an object in the class of objects, for example various images that each include a human face.

The method then comprises a step 110 of generating a set of projected vectors of a second dimensionality by applying a variable projection to each feature vector in the set of feature vectors. For example, the feature vectors in the set of feature vectors may have relatively high dimensionality, with the feature vectors each comprising more than one thousand components. In some examples, the variable projection may project each feature vector in the set of feature vectors into a lower-dimensional space:

$$S_k^i = V_k \cdot P^i$$

where $V_k$ is a feature vector in the set of feature vectors, $P^i$ is a variable projection, for example a projection matrix, and $S_k^i$ is a projected vector. The feature vector $V_k$ has a first dimensionality. The second dimensionality of the projected vector is less than the original, first, dimensionality of the feature vector, and is preferably at least five times less, for example less than 200 components in this example. The variable projection matrix $P^i$ has a dimensionality for projecting from the first dimensionality to the second. Each row of the projection matrix $P^i$ may have unit length.

In some examples, the variable projection comprises a random, or pseudorandom, projection. For example, the variable projection may be generated randomly or pseudorandomly. In cases where the variable projection comprises a variable projection matrix for applying to a vector, for example a feature vector, the variable projection matrix may in some examples comprise a random, or pseudorandom, projection matrix. For example, a random or pseudorandom projection matrix may be a projection matrix comprising components that are generated randomly or pseudo-randomly. There are various ways to generate a random or pseudorandom projection matrix, for example by using a Gaussian distribution, or a simple distribution of predetermined possible values which the components may take, and associated probabilities for selecting each of the predetermined possible values.

Applying the variable projection $P^i$ to each feature vector $V_k$ in the set of feature vectors generates a set of projected vectors $S_k^i$ of a second dimensionality, the second dimensionality being lower than the first dimensionality.

The method 100 then comprises a step 115 of processing the set of projected vectors to generate a model for the class of objects. This processing of the set of projected vectors may use, or be carried out by, a linear classification model or method, such as a support vector machine (SVM) or a Fisher discriminant, for example. An SVM is a supervised machine learning technique for solving classification tasks that are based on the concept of decision planes to distinguish objects of different class. For example, a hyperplane in a multidimensional space may be constructed which separates, with maximum margin, positive and negative training examples. The linear classification model or method may therefore be used to linearly separate points (e.g. corresponding with images that include an object of the class of objects) from a set of other points (e.g. corresponding with images that do not include an object of the class) in the lower-dimensional projected space.

A model $m_j$ is generated from the set of projected vectors $S_k^i$. The set of projected vectors may be considered a training set for producing a model $m_k$. For example, an SVM may employ quadratic optimization of error in a training process using the set of projected vectors.

Finally, the method 100 comprises a step 120 of applying a projection to the model to generate an object classification model, of the first dimensionality, for the class of objects. The projection applied to the model $m_k$ is different to the variable projection applied to the feature vectors in the step 110 of generating the set of projected vectors. While the variable projection may reduce the dimensionality of the vectors by projecting the set of feature vectors of the first dimensionality into a set of projected vectors of the (lower) second dimensionality, the projection applied to the model $m_k$ projects the model into higher dimensional space; generating an object classification model $M_k$ of the first dimensionality, which is higher than the second dimensionality, and preferably at least five times that of the second dimensionality.

Generating object classification models in this way, by projecting the feature vectors via a variable projection into the second, lower, dimensionality allows for training in a lower dimensional space. For example, training a classifier such as an SVM in the original feature space would be burdensome and impractical due to the high dimensionality—the feature vectors may have more than one thousand components in some examples. However, projecting the feature vectors into the lower dimensionality maintains the separability of the dataset (set of vectors) while allowing for the possibility of classifying, or clustering, with a linear classification model, for example. Projecting the generated model into the first dimensionality, higher than the second dimensionality, allows for the generated object classification model to be used for classifying objects (in the class of objects associated with the object classification model) during real-time image capture, as described in example implementations below. For example, the first dimensionality may be equal to the first dimensionality in certain cases, meaning that a classifier implementing an object classification model generated according to the disclosed methods may be capable of receiving (unknown) image data comprising feature vectors and classifying objects in real time using the object classification model.

Object classification models generated in this way provide particular advantages in cases where the object for classifying (an object of a predetermined class of objects) varies, or is distorted in the image data provided to the object classifier, for example where the images are captured via a wide-angle lens and/or an elevated image sensor. This method therefore allows for an object classifier, or object detection system, to store an object classification model in high-dimensional feature space for use in classifying objects that are subjected to variation and/or distortion during image capture. The object classifier or object detection system may hold several such object classification models for identifying and classifying objects in a particular class, which may be generated as set out in more detailed examples below.

In some examples, generating the set of projected vectors includes generating a plurality of sets of projected vectors of the second dimensionality, lower than the first dimensionality, by applying each of a plurality of variable projections to each feature vector in the set of feature vectors. For example, given a set V of feature vectors $V_k$, applying each of a plurality of variable projections $P^i$, $P^{i+1}$, ... to each feature vector in the set V generates a plurality of sets of projected vectors: $S^i$, $S^{i+1}$, ... where each set $S^i$ is associated with a variable projection $P^i$ (shown here by corresponding indices i, i+1, ... ) and comprises projected vectors $S_k^i$:

$$S^i = V \cdot P^i$$

In this notation, $P_{j,i}$ represents a variable projection to the second dimensionality j (from the first dimensionality k of the feature vectors) of index i.

In some examples, each variable projection $P^i$ in the plurality of variable projections $P^i$, $P^{i+1}$, ... may comprise a random, or pseudorandom, projection. For example, each variable projection may be randomly, or pseudo-randomly, generated. In certain cases, the variable projection may comprise a variable projection matrix for applying to a vector, for example a feature vector. In such a case, the variable projection matrix may comprise a random, or pseudorandom, projection matrix, for example, a projection matrix comprising components that are generated randomly or pseudo-randomly. There are various ways to generate a random or pseudorandom projection matrix, for example by randomly selecting a value from a predetermined set of values, such as a distribution. Probabilities of selection may be associated with distribution values, for example, a Gaussian distribution may be used, or a discrete distribution of a set of values may alternatively be used.

In examples where a plurality of sets of projected vectors ($S^i$, $S^{i+1}$, ...) are generated, each of the plurality of sets of projected vectors may be processed to generate a plurality of models ($m_k^i$, $m_k^{i+1}$, ...) for the class of objects. For example, thousands of variable projections $P^i$ may be used, generating thousands of sets of projected vectors $S^i$, which in turn may be processed to generate thousands of models; each model $m_k^i$ corresponding to a set of projected vectors $S^i$.

In some examples, the step 120 of applying the projection to the model may comprise applying a projection to each of the plurality of models ($m_k^i$, $m_k^{i+1}$, ...) to generate a plurality of object classification models ($M_k^i$, $M_k^{i+1}$, ...), of the first dimensionality, for the class of objects. The projection applied to each of the plurality of models may, for example, be the inverse of the associated variable projection ($P^i$, $P^{i+1}$, ...). Where the variable projections are represented by matrices, the inverse matrix may be applied in this step 120, for example. In some cases, the inverse matrix may be the variable projection matrix transposed.

In certain cases, the method may include testing each model of the plurality of models ($m_k^i$, $m_k^{i+1}$, ...), and indicating an accuracy value for each model based on the testing. For example, the models may be tested by cross-validation in order to assess how accurate each model is, and how results associated with each model will generalise to an independent (unknown) dataset. The cross validation may be 10-fold in a particular example, but may be k-fold in other examples, where k is a predetermined number (not associated with index k of the vectors or matrices). In other examples, the models are tested on an independent verification (known) dataset.

A subset of the plurality of models may then be selected based on the accuracy values of the models indicated in the testing. For example, the subset may comprise a first predetermined number of models, which are selected as those models with the highest accuracy values. In some examples, the subset is a first subset of the plurality of models, and a second subset of models may be selected from the first subset. The second subset may include a second predetermined number of models selected from the first subset by a selection method. In some examples, a clustering algorithm may be used during selection of the subset of models.

Figure 2:
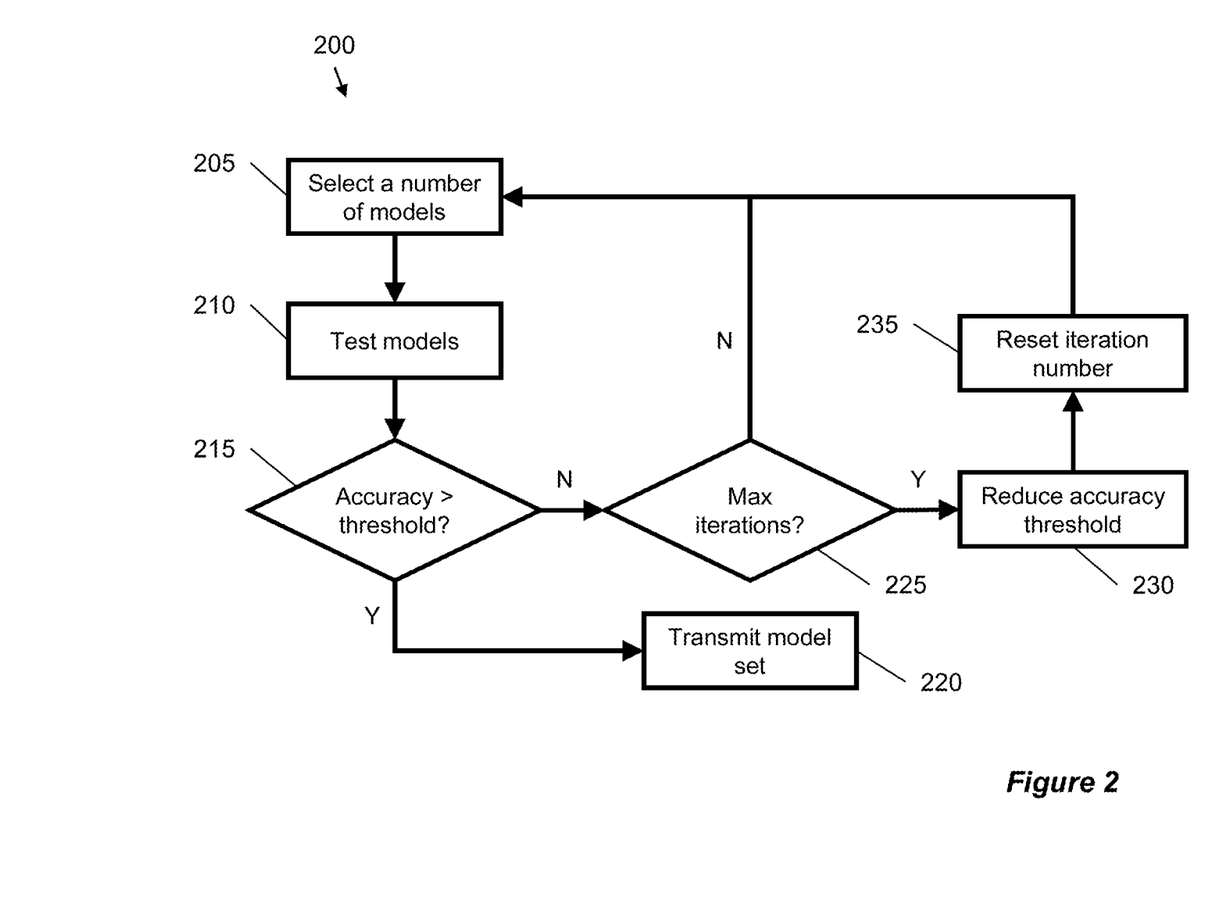
FIG. 2 shows a flow diagram of a method according to some embodiments.

FIG. 2 shows a flow diagram of such a selection method according to an example. The example selection method 200 shown begins with a selection step 205, wherein the second predetermined number of models ($m_k^i$, $m_k^{i+1}$, ...) are selected, for example randomly or pseudo-randomly, from the first subset. In an example, the second predetermined number is sixteen. The second predetermined number of models are then tested at the next step 210, for example by cross validation or using an independent verification dataset. The testing step 210 gives an accuracy output for the second predetermined number of models combined.

At the next step 215 of the selection method 200, the accuracy of the models is compared to a predetermined threshold. If the accuracy is above the threshold, or equal to the threshold in some examples, the models that were selected in the selection step 205 are transmitted as the model set in a transmission step 220. If the accuracy of the models is below or equal to the threshold, or in some examples below but not equal to the threshold, then a number of iterations of the selection, testing and accuracy comparison steps 205, 210, 215 is compared to a maximum iteration threshold i.e. the maximum number of iterations of those steps 205, 210, 215 permitted in the selection method 200, at the next step 225. If the maximum iteration threshold has not been reached, the selection step 205 is carried out a further time to select a new second predetermined number of models from the first subset, followed by the testing step 210 and accuracy comparison step 215 for the new selected models. If the maximum number of iterations has been reached in the iteration comparison step 225, the next step 230 comprises reducing the accuracy threshold for the accuracy comparison step 215. The step 230 of reducing the accuracy threshold may involve a rule such as determining the new accuracy threshold as a predetermined fraction of the previous accuracy threshold, for example 99% of the previous accuracy threshold. This step is followed by a step 235 of resetting the number of iterations of the selection, testing and accuracy comparison steps 205, 210, 215, for example to zero, for comparing in the iteration comparison step 225. The selection method 200 is then iterated, beginning with a new selection of models made from the first subset in the selection step 205.

In certain examples where a subset of the plurality of models is selected, a projection may be applied to each model in the subset of the plurality of models ($m_k^i$, $m_k^{i+1}$, ...) to generate a plurality of object classification models ($M_k^i$, $M_k^{i+1}$, ...) for the class of objects. The object classification models may be of the first dimensionality. The subset may be the first subset or the second subset, according to described examples. As described with reference to FIG. 1, the projection applied to each model of the subset of the plurality of models ($m_k^i$, $m_k^{i+1}$, ...) may, for example, be the inverse of the associated variable projection ($P^i$, $P^{i+1}$, ...). Where the variable projections are represented by matrices, the inverse matrix may be applied, for example.

The plurality of object classification models for the class of objects may be stored in, or accessible by, a classifier for use in classifying objects, particularly those that are subjected to variation and/or distortion during image capture, as described with reference to apparatus examples below.

In any of the described examples, the processing of the projected vectors, for example each of the plurality of sets ($S^i$, $S^{i+1}$, ...) of projected vectors $S_k^i$ to generate a plurality of models ($m_k^i$, $m_k^{i+1}$, ...) for the class of objects, may use a linear classification model. For example, the linear classification model may comprise at least one of a support vector machine, a two neuron classifier, or a Fisher discriminant.

In examples where the processing of the projected vectors uses a linear classification method, the process may be represented by matrix multiplication. For example, in an alternative matrix notation, a set feature vectors V are projected by projection matrices P to produce projected vectors, or training sets, S as: $S_j = V \cdot P_j$. Each set S of projected vectors may be trained or modelled, for example a linear classification technique, to produce a set of models $m_j$, as described. The process may be represented by matrix multiplication, such that an output $R_j$ from the linear classification may be represented in this alternative matrix notation as:

$$R_j = m_j \cdot (V_k \cdot P_j)^T$$
$$= V_k \cdot (m_j \cdot P_j^T)^T$$
$$= V_k \cdot M_j^T$$

wherein $V_k$ is a k-dimensional feature vector in the feature space of the first dimensionality, and $M_j$ may be regarded as a projection of a model $m_j$ of the second dimensionality into a space with the first dimensionality, higher than the second dimensionality. This may allow for the use of a dot-product machine or method, and may also remove the need of finding a low-dimensional projection for each vector, which is impractical due to the large size of the projection matrices and computational operation for each projection.

Compared to using a standard linear classifier as an approach to classifying objects subject to variation and distortion, the methods disclosed may be fed with training examples of objects that are distorted, or vary, in appearance—for example images of people as they appear captured via a fisheye lens in different positions. The methods are able to derive a plurality of object classification models, for example five, which may cover the entire space. The size of a training set required for the methods disclosed may also be smaller by two orders of magnitude compared to some other methods.

In any of the method examples described herein, the image data received may represent at least part of one or more images. Each of the one or more images may comprise an object of the class of objects, for example a predetermined class of objects that is of interest for detecting and/or classifying. The image data may be processed by a feature extractor to produce the image data comprising the set of feature vectors corresponding to the class of objects.

In certain cases, receiving the image data may comprise capturing image data representing at least part of an image using an image sensor, and on receiving an indication from an object detector that the image comprises an object of the class of objects, tracking the object and capturing, using the image sensor, image data. The object detector may be a standard object classifier or classification system, for example.

The image data may correspond to video frames comprising the object, for example. The image data may then be processed using a feature extractor to produce the image data comprising the set of feature vectors corresponding to the class of objects. This tracking and capturing may allow for generation of data sets for training a classification system based on at least one of the methods of processing image data described. In other methods for generating such data sets for training a classifier to be able to classify an object with a variety, or continuum, of different shapes or representations in the image data, one model may need to be associated to a particular shape. Thus, the number of models required may be extremely large and training the classifier would be computationally burdensome. Problems may also arise as the large number of models required may not be discrete enough, and identifying a natural boundary may also be difficult.

This method of capturing image data which may be used in generating, or adding to, a training data set may be implemented by an adaptive tracker for tracking the object in the class of objects. The adaptive tracker may follow the object from one frame to the next, for example, and may be able to track the object effectively when only small variations in position and shape may occur from one frame to the next. Typically, such visual trackers use an "object neighbourhood" derived from a frame, based on a position and size of the object in the previous frame Image content in the search area may be represented in a more compact form to represent image features, but may therefore also reduce the amount of information. A number of correlations may then be performed to match an object area representation (vector) from a previous frame with a number of possible object area representations (vectors) within an object neighbourhood in a current frame, in order to identify the new position of the object. Various techniques may be used to accumulate object representations over a number of frames to perform tracking more reliably.

Hence, in examples wherein a camera with a wide-angle lens, or a fisheye camera, is positioned on a ceiling, such a tracking system may record and track predetermined objects as they move around the camera's field of view, for example people as they walk around beneath the camera on the ceiling. Such an adaptive (visual) tracker is therefore able to build up one or more training sets automatically. These methods make use of the fact that a camera may take a large number frames per second and may therefore automatically create a set of training images. The methods may, in some examples, effectively crop or add thumbnails that may then be added to a set of training images.

Figure 3:
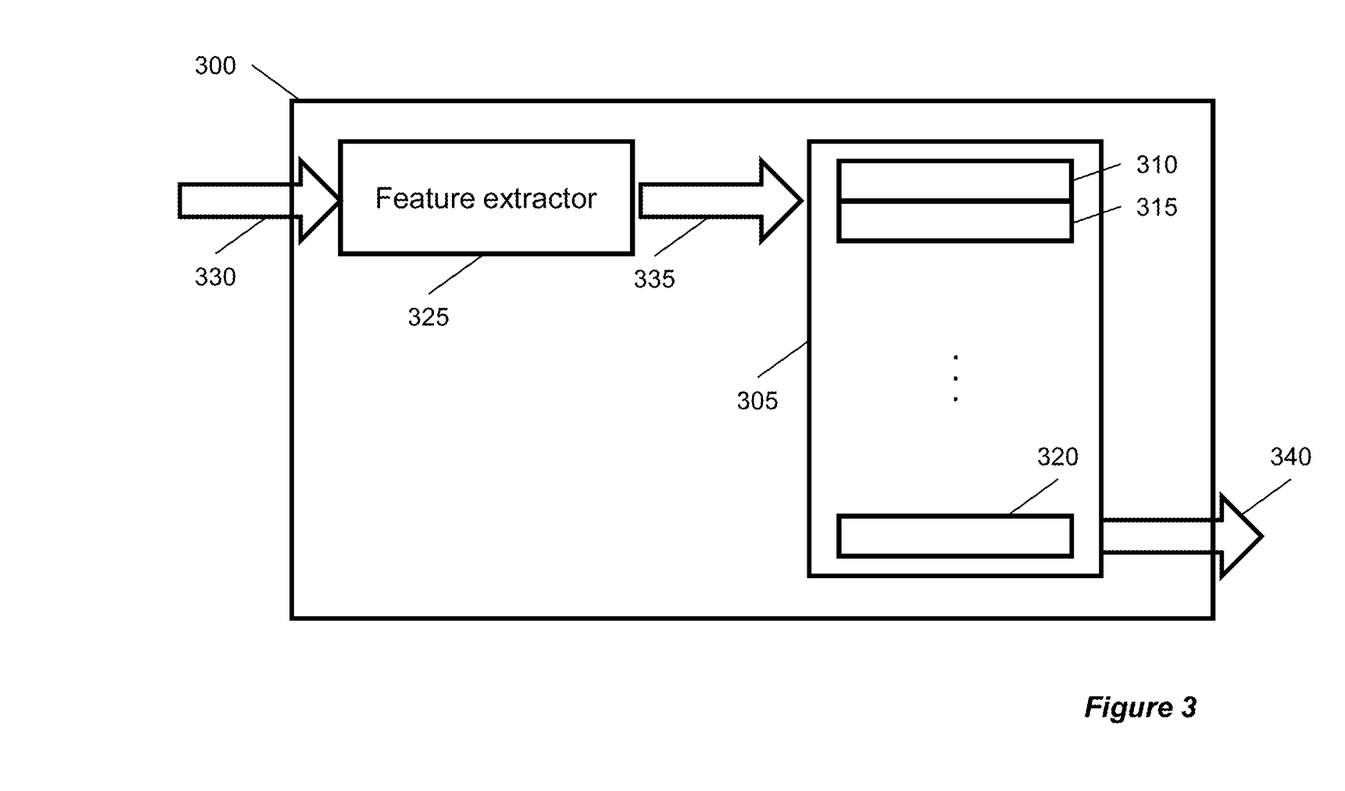
FIG. 3 shows a schematic representation of a computer vision apparatus according to some embodiments.

FIG. 3 shows a schematic representation of a computer vision apparatus 300 according to an example. The computer vision apparatus comprises a classifier 305. The classifier comprises at least one of the plurality of object classification models described in the method examples. The classifier 305 shown in this example comprises a number of object classification models 310, 315, 320. In a particular example, the classifier 305 comprises sixteen object classification models 310, 315, 320.

The computer vision apparatus 300 may, in some examples, further comprise a feature extractor 325 configured to receive image data 330 representing at least part of an image, and produce image data 335 comprising a plurality of feature vectors.

The classifier 305 may be configured to process the image data 335 comprising the plurality of feature vectors, for example as received from the feature extractor in the apparatus 300 shown in FIG. 3. The classifier 305 may also be configured to determine, using the at least one of the plurality of object classification models 310, 315, 320, whether the image data 330 comprises an object in the class of objects corresponding to the object classification models 310, 315, 320. In some examples, the classifier 305 may also be configured to indicate whether the image data 330 comprises an object in the class of objects corresponding to the object classification models 310, 315, 320. For example, the classifier 305 may transmit an indication 340 of a positive or negative classification.

The computer vision apparatus 300 may comprise an integrated circuit, or computer chip, in some examples.

Figure 4:
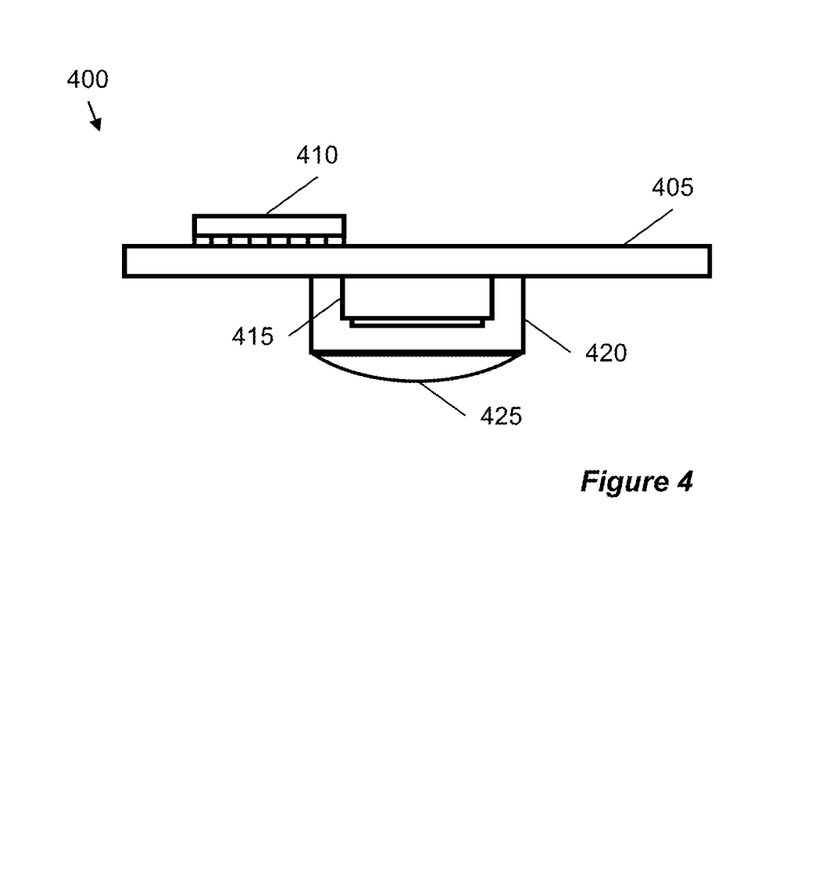
FIG. 4 shows a schematic representation of a computer vision apparatus according to some embodiments.

FIG. 4 shows a schematic representation of a computer vision apparatus 400 according to an example. The computer vision apparatus comprises an image sensor 415, which may capture image data representing at least part of an image. The image sensor 415 may be comprised within a sensor module 420 communicatively connected to a printed circuit board (PCB) 405. The computer vision apparatus 400 may comprise an integrated circuit or computer chip 410 which may incorporate an example of the computer vision apparatus 300 described with reference to FIG. 3. For example, the computer chip 410 may include a classifier comprising at least one of the plurality of object classification models described in the method examples. The computer vision apparatus 400 shown in FIG. 4 comprises a lens 425 connected to the sensor module 420. The image sensor 415 in the sensor module 420 may, for example, form image data as an array of pixels, each pixel representing an intensity of light received at the sensor 415 via the lens 425. The lens 425 may be a wide-angle lens or a fisheye lens in certain examples.

Figure 5A:
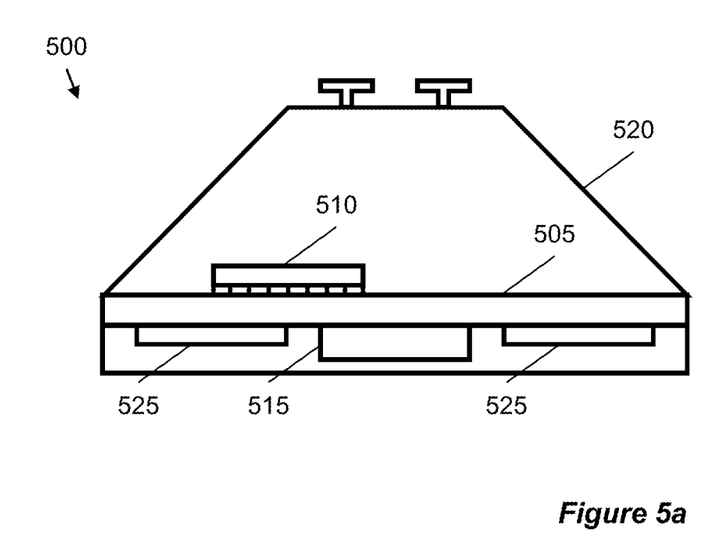
FIG. 5a shows a schematic representation of a computer vision apparatus according to some embodiments.

FIG. 5a shows a schematic representation of a computer vision apparatus 500 according to an example. The computer vision apparatus 500 comprises a lightbulb 520 and one or more light-emitting diodes (LEDs) 525 forming an LED light or lamp. The computer vision apparatus 500 also comprises an integrated circuit or computer chip 510 which may incorporate an example of the computer vision apparatus 300 described with reference to FIG. 3, and/or correspond with the computer chip 410 of the computer vision apparatus 400 shown in FIG. 4. The computer chip 510, comprising a classifier with at least one of the plurality of object classification models stored thereon, is connected to a PCB 505, which is communicatively connected to an image sensor 515.

Figure 5B:
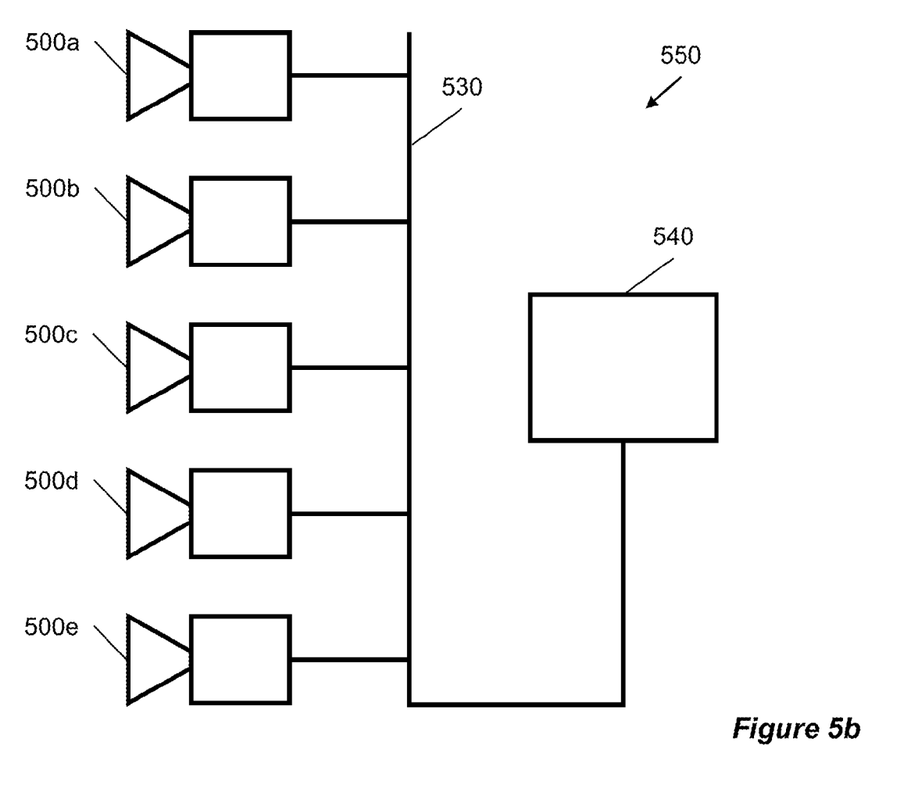
FIG. 5b shows a schematic representation of a computer vision apparatus according to some embodiments.

FIG. 5b shows a schematic representation of a computer vision apparatus 550 according to an example. The computer vision apparatus 550 comprises a plurality of computer vision apparatuses 500a, 500b, 500c, 500d, 500e, each corresponding to an implementation of the computer vision apparatus 500 described with reference to FIG. 5a. Each of the computer vision apparatuses 500a, 500b, 500c, 500d, 500e may comprise a computer chip 510 for object detection, including a classifier with one or more object classification models corresponding to a predetermined class of objects for detection, for example human faces. The computer vision apparatuses 500a, 500b, 500c, 500d, 500e may each be connected in a network 530, and in communication with a network hub 540. The network hub 540 may be a smart home/office/building system and/or a security system. In some examples, one or more of the computer vision apparatuses 500a, 500b, 500c, 500d, 500e may detect and/or classify an object, for example a human face, and transmit an indication of positive detection and/or classification to the network hub 540. The network hub 540 may then forward the indication to a user in an example.

Methods of the present disclosure may be implemented by way of a non-transitory computer-readable storage medium comprising a set of computer-readable instructions stored thereon which, when executed by at least one processor, cause the at least one processor to perform a method according to the present disclosure. The computer readable instructions may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read only memory (ROM), an erasable programmable read-only memory, or a portable disc.

The above embodiments are to be understood as illustrative examples. Further embodiments are envisaged. For example, different classes of objects may be predetermined for detection and/or classification. Thus, certain examples of the described methods may produce a plurality of first-dimensionality object classification models for each class of objects. Certain examples of the described computer vision apparatuses may therefore comprise the plurality of first-dimensionality object classification models for each class of objects.

Embodiments are also envisaged where the integrated circuit comprising the object classifier (which may store, or at least access, the object classification models) may be incorporated into an existing vision system, such as a conventional security camera featuring an image sensor and a wide-angle lens.

It is also envisaged that the methods of the present disclosure may additionally, or alternatively, be implemented in hardware for a fixed or portable device, such as a smart building sensor or fisheye security camera, or any other imaging device, for example a smartphone. Classification performed by a classifier comprising the object classification models generated according to the models may occur in real-time, for example during image capture by an image sensor in direct or indirect communication with the classifier.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure.

The invention claimed is:

1. A method of processing image data, the method comprising:
receiving image data comprising a set of feature vectors of a first dimensionality, the feature vectors corresponding to a class of objects;
generating a set of projected vectors of a second dimensionality, lower than the first dimensionality, by applying a variable projection to each feature vector in the set of feature vectors;
processing the set of projected vectors to generate a model for the class of objects; and
applying a projection to the model to generate an object classification model, of the first dimensionality, for the class of objects.

2. The method according to claim 1, wherein the variable projection comprises a random, or pseudorandom, projection.

3. The method according to claim 1, wherein generating the set of projected vectors comprises generating a plurality of sets of projected vectors of the second dimensionality by applying each of a plurality of variable projections to each feature vector in the set of feature vectors.

4. The method according to claim 3, wherein processing the set of projected vectors comprises processing each of the plurality of sets of projected vectors to generate a plurality of models for the class of objects.

5. The method according to claim 4, wherein applying the projection to the model comprises applying a projection to each of the plurality of models to generate a plurality of object classification models, of the first dimensionality, for the class of objects.

6. The method according to claim 4, comprising testing each model of the plurality of models and indicating an accuracy value for each model based on the testing.

7. The method according to claim 6, comprising selecting a subset of the plurality of models based on the accuracy values of the models.

8. The method according to claim 7, comprising applying a projection to each model in the subset of the plurality of models to generate a plurality of object classification models, of the first dimensionality, for the class of objects.

9. The method according to claim 1, wherein the processing the set of projected vectors to generate a model for the class of objects uses a linear classification model.

10. The method according to claim 9, wherein the linear classification model comprises at least one of:
- a support vector machine;
- a two neuron classifier; or
- a Fisher discriminant.

11. The method according to claim 1, the image data being captured by an image sensor.

12. The method according to claim 11, the image data representing at least part of one or more images, wherein each of the one or more images comprises an object of the class of objects, wherein the image data is processed by a feature extractor to produce the image data comprising the set of feature vectors corresponding to the class of objects.

13. The method according to claim 1, wherein receiving the image data comprises:
- capturing image data representing at least part of an image using an image sensor;
- on receiving an indication from an object detector that the image comprises an object of the class of objects, tracking the object and capturing, using the image sensor, image data corresponding to video frames comprising the object; and
- processing the image data using a feature extractor to produce the image data comprising the set of feature vectors corresponding to the class of objects.

14. A non-transitory, computer-readable storage medium comprising a set of computer-readable instructions stored thereon which, when executed by at least one processor, cause the at least one processor to:
- receive image data comprising a set of feature vectors of a first dimensionality, the feature vectors corresponding to a class of objects;
- generate a set of projected vectors of a second dimensionality, lower than the first dimensionality, by applying a variable projection to each feature vector in the set of feature vectors;
- process the set of projected vectors to generate a model for the class of objects; and
- apply a projection to the model to generate an object classification model, of the first dimensionality, for the class of objects.

15. A computer vision apparatus comprising a classifier, the classifier comprising at least one of a plurality of object classification models generated by:
- receiving image data comprising a set of feature vectors of a first dimensionality, the feature vectors corresponding to a class of objects;
- generating a set of projected vectors of a second dimensionality, lower than the first dimensionality, by applying a variable projection to each feature vector in the set of feature vectors;
- processing the set of projected vectors to generate a model for the class of objects; and
- applying a projection to the model to generate an object classification model, of the first dimensionality, for the class of objects.

16. The computer vision apparatus according to claim 15, comprising a feature extractor configured to:
- receive image data representing at least part of an image; and
- produce image data comprising a plurality of feature vectors.

17. The computer vision apparatus according to claim 16, comprising an image sensor, wherein the image data representing at least part of an image is captured by the image sensor.

18. The computer vision apparatus according to claim 16, wherein the classifier is configured to:
- process the image data comprising the plurality of feature vectors; and
- determine, using the at least one of the plurality of object classification models, whether the image data comprises an object in the class of objects corresponding to the object classification models.

19. The computer vision apparatus according to claim 18, wherein the classifier is configured to indicate whether the image data comprises an object in the class of objects corresponding to the object classification models.

* * * * *